United States Patent [19]
Hunt

[11] Patent Number: 6,029,122
[45] Date of Patent: Feb. 22, 2000

[54] TEMPO SYNCHRONIZATION SYSTEM FOR A MOVING LIGHT ASSEMBLY

[75] Inventor: Mark A. Hunt, Birmingham, United Kingdom

[73] Assignee: Light & Sound Design, Ltd., Birmingham, United Kingdom

[21] Appl. No.: 09/034,045

[22] Filed: Mar. 3, 1998

Related U.S. Application Data

[60] Provisional application No. 60/038,136, Mar. 3, 1997.

[51] Int. Cl.[7] .................................................. F21V 33/00
[52] U.S. Cl. ........................... 702/188; 364/132; 362/85; 340/825.5
[58] Field of Search ........................... 702/188; 364/132; 362/85, 233, 239; 340/825.5, 825.49

[56] References Cited

U.S. PATENT DOCUMENTS

| | | | |
|---|---|---|---|
| 4,419,918 | 12/1983 | Dyck et al. | 364/761 |
| 4,980,806 | 12/1990 | Taylor et al. | 364/132 |
| 5,406,176 | 4/1995 | Sugden | 362/233 |
| 5,504,477 | 4/1996 | Whilright et al. | 340/825.5 |
| 5,769,527 | 6/1998 | Taylor et al. | 362/85 |

*Primary Examiner*—Marc S. Hoff
*Assistant Examiner*—Hien Vo
*Attorney, Agent, or Firm*—Fish & Richardson P.C.

[57] ABSTRACT

A time synchronizing unit operates to synchronize lamps with various indicia. Each of these indicia are tied to a system clock. The system clock is normally incremented at specified intervals, e.g., every 4 milliseconds. The system is to be synchronized with a stage lighting production such as a song. If the tempo of the song changes, the amount of time between interrupts changes. Hence the time when things occur will be varied as the system clock changes. This enables varying the time when the things occur without actually changing the program: the time is bent to accommodate the new tempo of the program.

25 Claims, 4 Drawing Sheets

TEMPO SYNCHRONIZATION SYSTEM FOR A MOVING LIGHT ASSEMBLY

This application claims the benefit of U.S. Provisional application Ser. No. 60/038,136 filed Mar. 3, 1997.

FIELD OF THE INVENTION

This application relates to a tempo synchronization system for a stage lighting system. More specifically, the present application describes a system which enables global adjustment of clock values in a plurality of remotely controlled stage lighting units, and synchronizes all of those stage lighting units with a common variable source.

BACKGROUND AND SUMMARY

Modern stage lighting systems are typically controlled by computer-based controlling systems.

The complexity of such stage lighting systems has necessitated increased computing power. There has been a tendency to distribute that increased computing power among the luminaires by making each of the luminaires into an intelligent subsystem.

The distributed computing power is effected by a central processing computer and a number of slave processing computers which accept their commands from the central processing computer.

One example of such a system is the ICON(TM) system made by Light & Sound Design, Ltd., the assignee of the present application. The Light and Sound system uses a central controller ("the ICON controller") to control a plurality of distributed processing units that are located in the ICON lamp units. Each ICON lamp unit has a number of processors controlling various functions of the unit.

An exemplary command from the ICON controller to the ICON unit might be parsed as: go to position X at speed S and be there at time Y. The ICON unit receives this command, and uses its own processor to determine how to drive the motors and when to start, etc, to carry out this command.

According to the preferred embodiment, all of the operations are synchronized to a single clock: a system clock. This has the advantage of requiring maintenance of only one clock.

The inventors recognized that various things, including timing, may change during a performance. Sometimes the tempo of the song they are playing may change between rehearsal and the playing time. Some aspects of the lighting performance may need to be synchronized with that operation.

The inventors of the present invention, having recognized these problems, have devised a feature allowing the timing of operations to be changed globally. A preferred embodiment describes a system where operations of both the main system and the subsystem are tied to the system clock. The system clock can be selectively changed in a way that causes those synchronized operations to operate at a different effective rate. When the time for one clock pulse changes, everything referenced to that clock pulse will change as well. This enables, for example, the tempo provided by the clock to be changed to match the tempo of a particular song being played.

As an example of the way the system could be used, assume a light chase including a plurality of lighting effects. Lighting effect no. 2 follows lighting effect no. 1 and lighting effect no. 3 follows lighting effect no. 2 and so on. This all continues until the end of the chase. The chases can be synchronized with, for example, clock timings.

A system clock is changed in order to change various aspects which are synchronized with that system clock. According to one aspect, a show with sequential lighting events has operations which are timed to coincide with incidents in music. The cues are triggered from a system timing element in the console, and times are controlled by the clock in the console. According to this aspect, the console's effective clock running frequency is modified. The cues remain synchronized with the clock, but since the clock has been changed, the cues occur at different absolute times. This operation is referred to herein as Time Bending (TM).

Specific ways of carrying out this operation are described.

BRIEF DESCRIPTION OF THE DRAWINGS

These and other aspects will now be described in detail with reference to the accompanying drawings, wherein.

DESCRIPTION OF THE PREFERRED EMBODIMENTS

Figure 1:
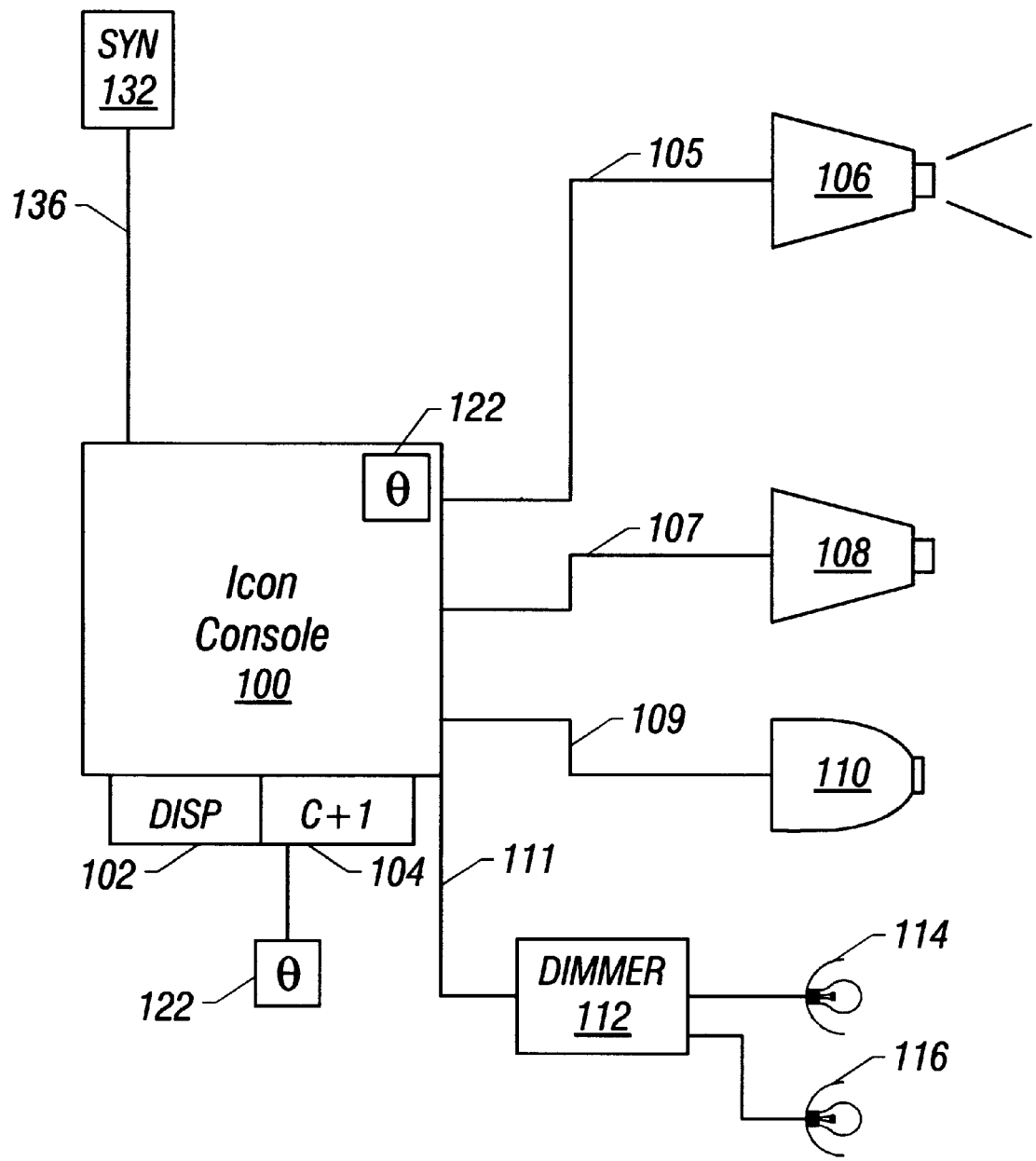
FIG. 1 shows a block diagram of the invention.

FIG. 1 shows a block diagram of the preferred embodiment using a time bending system. ICON console 100 includes processor circuitry therein including a clock element 120 which is preferably effected as described herein. ICON console 100 also includes a display unit 102 and a controlling unit 104.

The architecture of the ICON console uses a separate controlling line for each multi-parameter fixture being controlled. FIG. 1 includes two ICON units 106, 108, although in reality many more would be expected. A Wash Lamp (TM) unit 110 is also shown. Single parameter fixtures 114, 116, may be controlled from a single line 111.

Therefore, lines 105, 107, and 109 each carry information from a single unit. Line 111, however, may carry a plurality of time division multiplexed information. This information is distributed to dimmer rack 112 which feeds a number of single parameter (e.g., dim-only) lighting fixtures 116, 118.

Both the ICON console 100 and the ICON units 106, 108 include their own processor controlling the operations. The Wash Lamp unit 110 may also include a processor. These elements of the lighting system are commanded at certain times to carry out a prestored "cue", which can be either an operation or a sequence of various operations.

A show is formed of a sequence of lighting events which are carried out to occur one after another within the show. At least some of the cues are timed to coincide with incidents within the music being played. However, those cues are actually triggered by the clock in the console. Hence, those timings within the system are controlled by the clock in the console. The cue is commanded to occur at the right moment. The timing of the cue is often determined by incidents in the music.

No two shows, however, have precisely the same tempo. Therefore, the inventors have devised a way of changing the entire timing of the system. This is done by adjusting the console's concept of time.

Time is measured by beats per minute, i.e., the number of beats which occur in one minute. The ICON usually uses 120 beats per minute, and the timing of the shows is based on that 120 beats per minute. According to a first aspect of the present invention, a new time can be entered by encoder knob 122. This entry device can be an optical encoder which detects movements and produces pulses corresponding to those movements.

This embodiment uses a clock which pulses at 120 beats per minute. The encoder commands change of the speed of the clock. The encoder includes controls between +10 and −10. Positive 10 in this embodiment commands an increase of speed of the clock by 50% to 180 beats per minute, while negative 10 can represent a slowdown of the clock by 50% to 60 beats per minute. An alternative system simply uses each predetermined amount of movement of the encoder representing 5 beats per minute. Of course, any other scale and amount of rotation could alternately be allowed.

The actual clock value is displayed on display 102.

A second technique allows the current tempo to be entered via control 104. Control system 104 allows entry of an "edit time" command. When the edit time button is pressed, the console enters a data entry mode. A new tempo in beats per minute can be entered into the system.

Yet another system of controlling tempo uses an automated approach which synchronizes with the music being played. The ICON console 100 receives a MIDI input over cable 130 from one or more musical instruments. For example, synthesizer 132 produces a MIDI output which is connected to ICON console 100. In this embodiment, ICON console monitors the MIDI output to determine a tempo from that MIDI stream.

Figure 2:
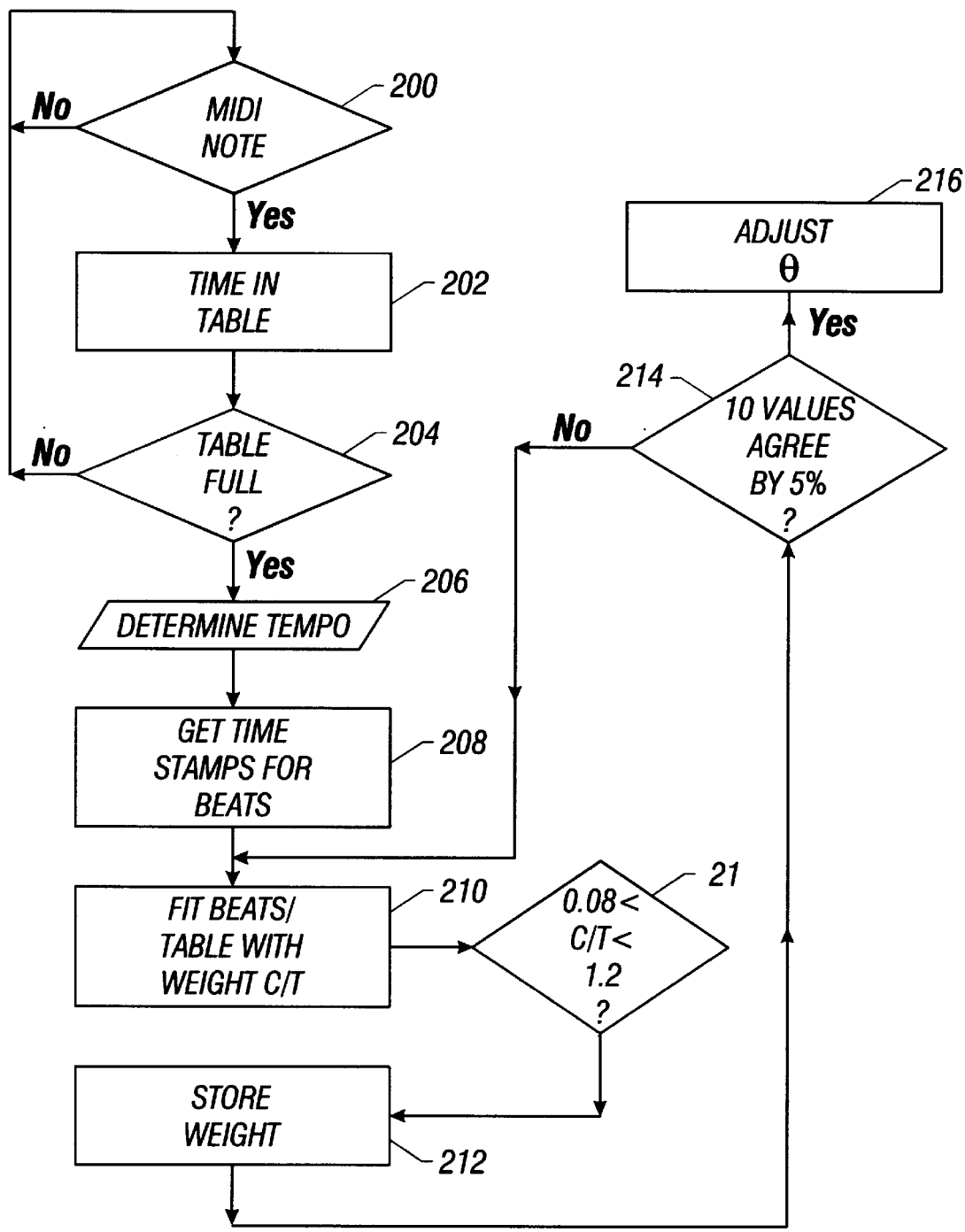
FIG. 2 shows a flowchart of an automated operation of this system.

The flowchart of FIG. 2 is carried out for each song which is played. At step 200, the system monitors for the presence of a MIDI event representing a note having been played. If such a MIDI event is not received at 200, the system continues to monitor the MIDI note stream until a note is detected.

The embodiment takes cognizance of the fact that not every note will be played at every tempo period. Therefore, an expected fit of synchronization with these MIDI notes needs to be made.

A MIDI note is detected at step 200. The time when the MIDI note was produced is stored as a time stamp in a table at 202. A predetermined number of samples being stored in the table at 202 represents a statistical sample that is likely to allow determination of tempo, e.g. 300 samples. When the table is considered as full at step 204, control passes to step 206 which determines the tempo from the values in the table.

The preferred determination of tempo value is based on the assumption that the tempo value already being used is close to the actual tempo value.

This system calculates times between the time stamps at step 208.

Synchronization is carried out at step 210 by calculating the weighting value C/T, where C is the time between beats of the clock, and T is the time between time stamps determined at step 208. Only C/T values which are close to 1 are retained; the others are assumed to be odd notes. If C/T is determined to be between 0.8 and 1.2 at step 211, the value is stored into a table at step 212 as a weighting value. When ten values are determined to agree by 5% at step 214, that weighting value is used to adjust the clock C at 216.

The value of weighting which corresponds to the closest fit is then used to adjust the tempo. When the tempo is adjusted by that weighted value, the new tempo becomes the closest fit to the musical events.

Once the new tempo has been determined by any of the above techniques, (encoder, edit time, or MIDI autodetect) the time in the console is changed in accordance with that new tempo. This is carried out according to the flowchart of FIG. 3.

Step 300 represents the system acquiring the new tempo using one of the techniques described previously, or any other technique of obtaining a new tempo for the entire system. That tempo needs to be translated into the console at step 301.

Figure 4:
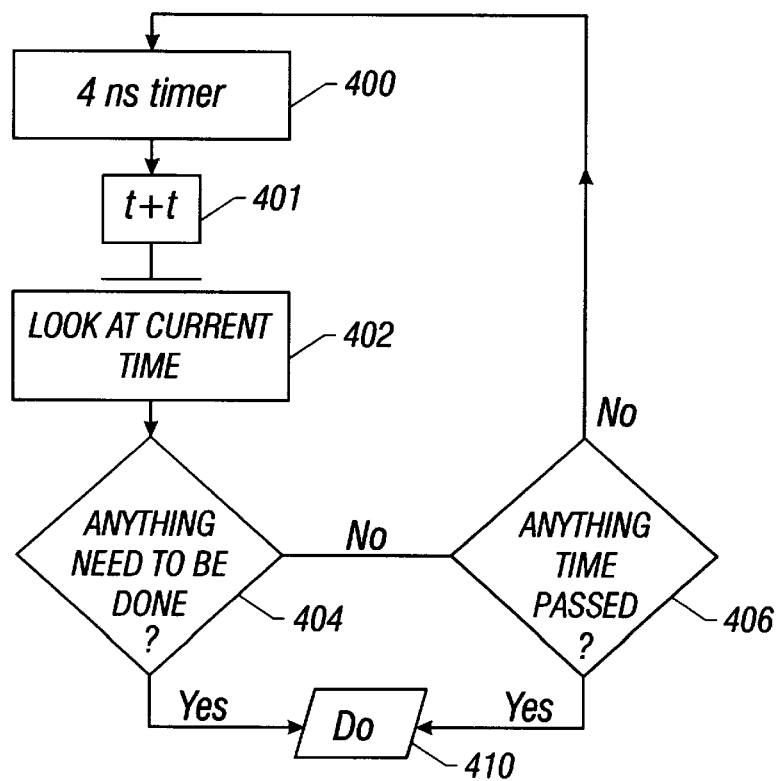
FIG. 4 shows a flowchart illustrating how operations are carried out relative to timing.

The ICON console operates using a processor which is clocked at 16 megahertz. Tempo is controlled according to the flowchart of FIG. 4. Every predetermined period of time P, nominally 4 ms, a timer produces a special pulse at step 400 which initiates a timer determination routine which is diagramed in FIG. 4.

At step 401, the system timer is incremented so that the system time stamp is increased. This new incremented time will be used during the next interrupt. The current time is noted at step 402. At step 404 the system determines from the current time whether anything needs to be done. For example, at a predetermined time during the show, a cue may need to be advanced or a light moved. Each time the period P elapses, the system determines whether any of those timed events need to be executed.

If nothing needs to be done at step 404, the system determines at step 406 whether there is anything that needs to be done whose time has passed and is not yet done. If not, the interrupt ends and the routine is again executed in another time T. If either steps 404 or 406 are positive, however, control passes to step 410 which commands that the operation be effected.

This embodiment modifies the timer by adjusting the time between interrupts. This embodiment uses a time interrupt every T ms which increments the timer. Therefore each T ms advances the time by a fixed amount: T ms at 120 beats per minute. This is actually a granular clock speed adjustment, but is sufficiently fast that human perception cannot determine that things are occurring with granularity. Accordingly, this system determines at each interrupt if something needs to be done and does it if necessary.

Figure 3:
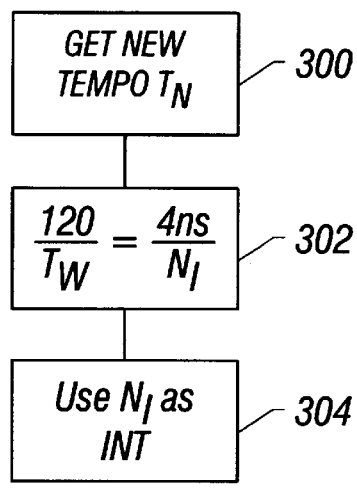
FIG. 3 shows a flowchart of how the tempo is used to adjust timings.

Therefore, returning to the flowchart of FIG. 3, after obtaining the new tempo $T_n$, the system determines a new interrupt time from the tempo according to the relation $$T_{new} = \frac{t_n}{C} \cdot T$$

where C is the pulses per second of the clock, T is the nominal interrupt value. Here C=120 and T=4 ms. This is carried out at step 302.

At step 304, the new tempo is written to the software timer which carries out the interrupt.

This has an important advantage in that when the tempo changes, the programming which has already been done does not need to be changed. Everything carries on as usual, since the programming still occurs at predetermined clock times. The clock's knowledge of time is changed: not the programming.

Figure 5:
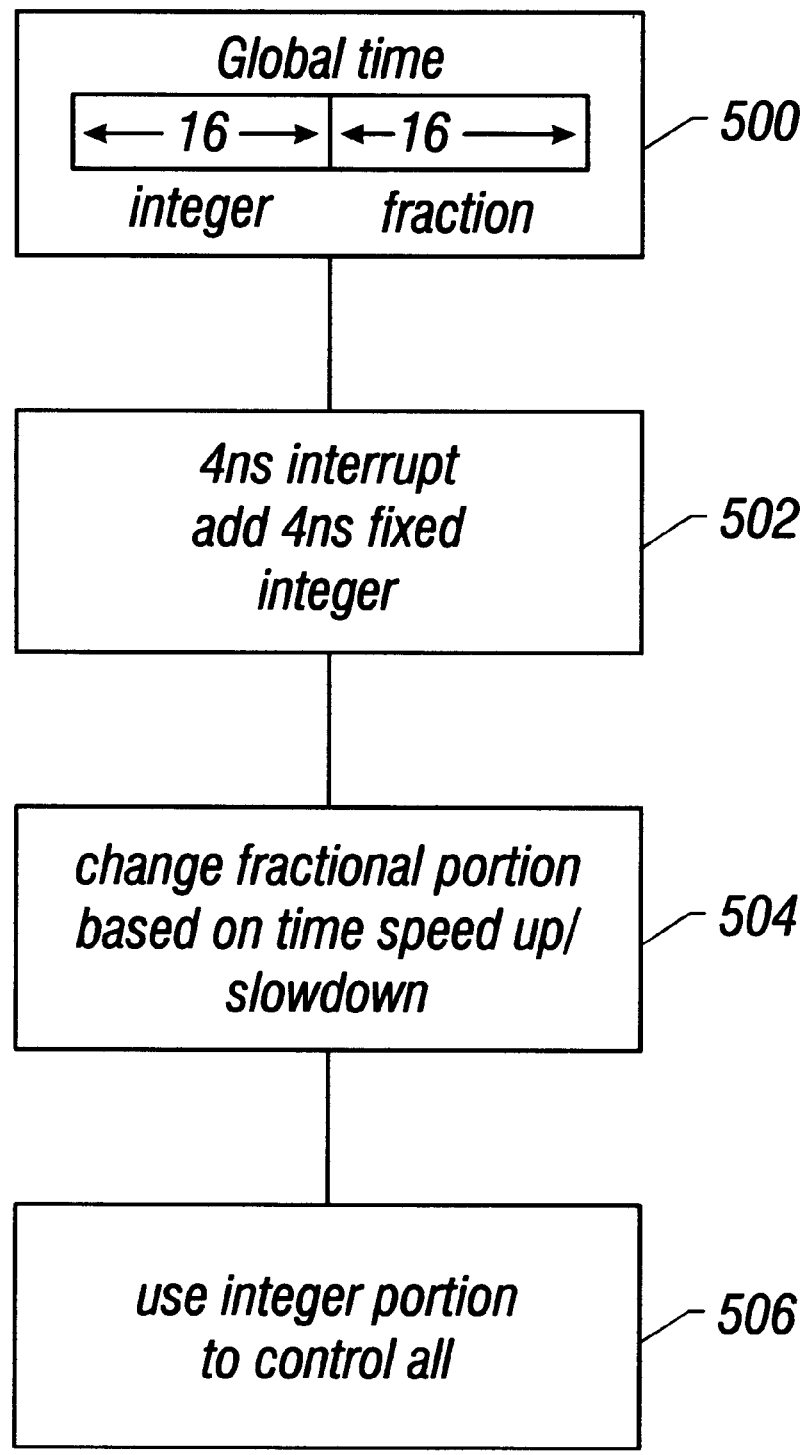
FIG. 5 shows a flowchart of operation showing maintaining global time as an integer part and a fractional part.

Yet another embodiment of the present invention uses the techniques shown with reference to the flowchart of FIG. 5. Step 500 shows the global time variable form in which time is maintained. The global time variable includes 32 bits: an integer 16-bit portion and a fractional 16-bit portion. The entire integer/fraction portion is used to maintain the time of the system. However, the timed elements respond only to the 16-bit integer part.

Step 502 represents each 4 ms interrupt period. A fixed point number is added to the interrupt routine. This fixed point portion is equivalent to 4 ms. Step 504 changes the fractional portion based on the time speedup/showdown. Hence, this changes the fractional portion according to that amount.

As explained above, the integer portion is used at step 506 to control all controlled features in the system. However, the main timing system maintains the fraction. The fraction, through its overflow/underflow effect on the integer, has the effect of granularly changing the timing operation.

All of the above systems have described use for global time maintaining where this global time maintaining operation can be local or remote. In a remote embodiment, either the time can be transferred to each remotely controlled device such as, remotely controlled luminaries, or a number can be transferred to those remotely controlled devices to change remote clocks throughout the system in an analogous way.

While the above has described using a software timer as the interrupt, it should be understood that the 16 MHZ clock could also be divided using a down counter operation. For example, the down counter can be preset with a particular value, and then initiated to count down from that particular value using the 16 MHZ clock. Each time the counter counts down to 0, this produces a clock pulse which also resets the counter, and re-presets the count down value. Different values being preset into the down counter allow different granularities of the clock with a $\frac{1}{16}$ MHZ granularity rate.

The operations carried on by the processor using this system are not in general changed by this system. The third embodiment described herein actually changes the processor clocking frequency. This changes the speed at which the processor operates. Many processors can be overclocked and underclocked in this way, while the system still operates properly. This requires that the processing unit be capable of operating at various clocking speeds. In contrast, the system of this first embodiment does not change anything about the way the processor operates. It only changes the time for purposes of controlling operations, without changing the processing speed of the clock.

This modification uses this system to actually adjust the clock for the microprocessor itself. In this case, the microprocessor clock of 16 megahertz might be varied between 14 megahertz and 18 megahertz. This could also be done using a fast clock such as a 100 megahertz clock which is divided down to form the microprocessor clock. This would have the same effect on the 4 ms interrupt: the system granularity would change in proportion to the change of clock. Applicants also contemplate that this system could be used without the 4 ms granularity described above, especially if the processor speed itself was changed as described in this modified embodiment.

Although only a few embodiments have been described in detail above, those having ordinary skill in the art will certainly understand that many modifications are possible in the preferred embodiment without departing from the teachings thereof. For example, it should be understood that while the present system describes single line per channel control, the present inventors also contemplate using the present invention with a system that controls a plurality of multi-parameter lights over a single line. Examples of such systems are found in systems by Vari lite, Inc. (TM) and systems controlled according to the industry standard DMX 512 protocol.

All such modifications are intended to be encompassed within the following claims.

What is claimed is:

1. A distributed stage lighting system with adjustable tempo, comprising:
   a plurality of controlled stage lights, distributed at a plurality of locations; and
   a controller for said stage lights, said controller connected to said stage lights and including a system clock that maintains an indication of time;
   said controller including a commanding element which sends commands to said plurality of lights at predetermined times that are set by the system clock in the controller and a time varying element which varies said indication of time in a way that causes said predetermined times of operation of said plurality of lights to be varied relative to one another.

2. A system as in claim 1 wherein said controller uses a system which checks at every predetermined interval of time to determine if an action should be taken.

3. A system as in claim 2 wherein said time varying element changes said interval of time to thereby adjust an amount of granularity between actions.

4. The system as in claim 1 wherein said time varying element varies a system clock.

5. The system as in claim 4 wherein said system clock is a clock of the microprocessor.

6. The system as in claim 4 wherein the said system clock is an incremented clock where incrementing occurs every predetermined interval of time, and wherein said interval of time is adjusted by said time varying unit.

7. The system as in claim 2, wherein said system includes interrupt driven routines, one of said routines incrementing a clock value by a specified amount, and wherein said time varying element changes said predetermined interval of time without changing said specified amount.

8. The system as in claim 1, wherein said system clock includes a main part and a fractional part, including lower resolution information than is contained in said main part, and wherein said main part is used to set said times.

9. The system as in claim 8, wherein said time varying element modifies said fractional part.

10. The system of claim 1, wherein said commanding element comprises a manual input device.

11. The system of claim 1, wherein said commanding element comprises an automated system which synchronizes with music being played.

12. The system of claim 11, wherein said automated system receives at least one MIDI note stream, and synchronizes with some aspect of said at least one MIDI note stream.

13. The system of claim 12, comprising determining a MIDI event, determining whether said MIDI event fits with a current tempo by a predetermined amount, and if not, adjusting said tempo to synchronize with the MIDI event.

14. A distributed processing varying system, comprising:
   first and second distributed processing objects, each including lighting devices which are remotely controllable, said first and second distributed objects each including a processor which is commanded at certain times to carry out certain operations;
   a lighting controller, connected to said first and second distributed processing objects, said controller operating to provide commands to carry out said operations to said first and second distributed objects, said controller comprising a controlling system which commands operations to be carried out at determined times, a time changing element, receiving an indication of a new time synchronizing indicia, and a time synchronizing device, responsive to said time changing element, for synchronizing said operations with the predetermined times, said time synchronizing unit being changed by said time changing unit to thereby change the times when operations occur in both said first and second distributed processing units.

15. The system as in claim 14, further comprising a system clock, maintaining a global time, wherein said time changing element includes a first routine that increments said clock each time run, and a second routine that varies times when said first routine is run.

16. The system as in claim 14, further comprising a system clock, maintaining a global time as a highly resolved part and a lower resolved part, wherein said time changing element changes the lower resolved part.

17. The system as in claim 16, wherein said higher resolved part is an integer part used for determining timing, and said lower resolved part is a fractional part.

18. The system as in claim 14, further comprising an element which determines synchronization with an accompanying musical program, and provides said information to said time changing element.

19. A method of changing a timing of a system, comprising:

synchronizing a plurality of lighting events occuring at different separated locations with times that are set in a system clock;

determining if said system clock needs to be modified to cause said lighting events to occur at a desired tempo; and modifying said system clock if modification is necessary.

20. A method as in claim 19, wherein said modifying comprises changing an amount of time between updates of a system clock without changing an amount that the system clock is updated at each said update.

21. A method as in claim 19, wherein said modifying comprises changing a fractional amount of clock update.

22. A method as in claim 19, wherein said determining comprises a manual action of changing a setting on a manual device.

23. A method as in claim 19, wherein said determining comprises automatically synchronzing said system clock with a musical program.

24. A method as in claim 23, wherein said determining comprises synchronizing with a MIDI stream.

25. A distributed lighting system, comprising:

a plurality of computer controlled lights, each being remotely controllable;

a controller, having controls which control said plurality of computer controlled lights, and having an input representing information in MIDI format from at least one musical instrument, said controller including an element which synchronizes an internal timer with a temp of music represented by said information, and automatically changes controlling said lights according to said internal timer.

* * * * *